(12) United States Patent
Jaaskelainen et al.

(10) Patent No.: US 10,287,854 B2
(45) Date of Patent: May 14, 2019

(54) VORTEX ENERGY HARVESTER FOR DOWNHOLE APPLICATIONS

(71) Applicant: Halliburton Energy Services, Inc., Houston, TX (US)

(72) Inventors: Mikko Jaaskelainen, Katy, TX (US); Brian V. Park, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/765,219

(22) PCT Filed: Dec. 16, 2015

(86) PCT No.: PCT/US2015/065944
§ 371 (c)(1),
(2) Date: Mar. 30, 2018

(87) PCT Pub. No.: WO2017/105419
PCT Pub. Date: Jun. 22, 2017

(65) Prior Publication Data
US 2018/0291711 A1    Oct. 11, 2018

(51) Int. Cl.
*H02N 2/18* (2006.01)
*E21B 41/00* (2006.01)
*E21B 47/16* (2006.01)

(52) U.S. Cl.
CPC .......... *E21B 41/0085* (2013.01); *E21B 47/16* (2013.01); *H02N 2/18* (2013.01); *H02N 2/185* (2013.01)

(58) Field of Classification Search
USPC .............................. 290/1 R, 43, 54; 310/330
See application file for complete search history.

(56) References Cited

U.S. PATENT DOCUMENTS

| | | | | |
|---|---|---|---|---|
| 4,387,318 A | * | 6/1983 | Kolm | F03B 13/141 310/330 |
| 4,536,674 A | * | 8/1985 | Schmidt | F03D 5/00 310/330 |
| 6,504,258 B2 | * | 1/2003 | Schultz | E21B 28/00 290/1 R |
| 7,199,480 B2 | * | 4/2007 | Fripp | E21B 41/0085 290/1 R |
| 7,208,845 B2 | * | 4/2007 | Masters | H02K 7/1892 290/1 R |

(Continued)

OTHER PUBLICATIONS

PCT Application Serial No. PCT/US2015/065944, International Search Report, dated Aug. 30, 2016, 4 pages.

(Continued)

*Primary Examiner* — Pedro J Cuevas
(74) *Attorney, Agent, or Firm* — Gilliam IP PLLC

(57) ABSTRACT

The present invention relates to a system for vortex energy harvesting for downhole applications and a method thereof, the system comprising: one or more electro acoustic technology assemblies mounted downhole in close proximity to a fiber optic cable that is part of a fiber optic distributed acoustic sensing system connected back to a surface distributed acoustic sensing interrogator; and one or more vortex energy harvesters attached to each of the electro acoustic technology assemblies and exposed to a fluid flow in the downhole application.

19 Claims, 9 Drawing Sheets

(56) References Cited

U.S. PATENT DOCUMENTS

| | | | | |
|---|---|---|---|---|
| 7,224,077 B2* | 5/2007 | Allen | F03D 5/00 | 290/1 R |
| 7,242,103 B2* | 7/2007 | Tips | E21B 41/0085 | 290/1 R |
| 8,047,232 B2* | 11/2011 | Bernitsas | F03B 17/06 | 137/808 |
| 8,604,634 B2* | 12/2013 | Pabon | E21B 41/0085 | 166/65.1 |
| 8,786,113 B2* | 7/2014 | Tinnen | E21B 41/0085 | 290/1 R |
| 9,222,465 B2* | 12/2015 | Thorp | F03D 5/00 | |
| 9,447,774 B2* | 9/2016 | Olsen | F03D 5/00 | |
| 9,774,278 B2* | 9/2017 | Kim | H02N 2/185 | |
| 2001/0040379 A1* | 11/2001 | Schultz | E21B 28/00 | 290/1 R |
| 2005/0024231 A1 | 2/2005 | Fincher et al. | | |
| 2005/0230973 A1* | 10/2005 | Fripp | E21B 41/0085 | 290/1 R |
| 2005/0230974 A1* | 10/2005 | Masters | H02K 7/1892 | 290/1 R |
| 2006/0064972 A1* | 3/2006 | Allen | F03D 5/00 | 60/369 |
| 2006/0086498 A1* | 4/2006 | Wetzel | E21B 41/0085 | 166/250.12 |
| 2007/0176430 A1* | 8/2007 | Hammig | F03B 17/06 | 290/54 |
| 2008/0048455 A1* | 2/2008 | Carney | F03D 5/00 | 290/54 |
| 2008/0277941 A1* | 11/2008 | Bowles | E21B 41/0085 | 290/54 |
| 2011/0049901 A1* | 3/2011 | Tinnen | E21B 41/0085 | 290/54 |
| 2013/0119669 A1* | 5/2013 | Murphree | H01L 41/125 | 290/54 |
| 2018/0266240 A1* | 9/2018 | Jaaskelainen | E21B 47/101 | |
| 2018/0283143 A1* | 10/2018 | Jaaskelainen | H02J 50/10 | |
| 2018/0347348 A1* | 12/2018 | Jaaskelainen | E21B 47/18 | |

OTHER PUBLICATIONS

PCT Application Serial No. PCT/US2015/065944, International Written Opinion, dated Aug. 30, 2016, 6 pages.

Canadian Application Serial No. 3,001,299; Examiner's Letter; dated Feb. 13, 2019, 5 pages.

\* cited by examiner

VORTEX ENERGY HARVESTER FOR DOWNHOLE APPLICATIONS

BACKGROUND

This disclosure relates generally to systems for harvesting energy from downhole fluid flow based on Vortex Induced Vibration (VIV).

Fiber optic distributed sensing systems were developed in the 1980s to replace older measurement systems composed of multiple individual sensors.

Fiber optic distributed sensing systems are commonly based on Optical Time-Domain Reflectometry (OTDR) and utilizes techniques originally derived from telecommunications cable testing. Today fiber optic distributed sensing systems provides a cost-effective way of obtaining hundreds, or even thousands, of highly accurate, high-resolution measurements and today find widespread acceptance in industries such as oil and gas, electrical power, and process control.

Energy harvesting is the process by which energy readily available from the environment is captured and converted into usable electrical energy. Historically, downhole electrical power has been either via electrical wiring from the surface, limited life batteries, or turbines powered by drilling mud for MWD. All of these methods were used for creating significant power downhole. The advent of nano powered sensors, ultralow power microprocessors and other minimal powered devices opens up a new era for downhole telemetry when combined with fiber optic data transmission.

FIG. 3 shows a conceptual illustration of energy harvesting, leading to a perpetually powered sensor. This promises the possibility of sensors that use very small amounts of energy. What is needed is a method for downhole energy harvesting to power this new generation of electronics. The major sources of energy downhole are fluid flow, vibration, acoustics and heat. While the system described herein is based on the conversion of fluid flow using piezo electrics, conversion can also be accomplished using vibrating cantilevers, accelerometers, induction coils and magnets, impellers and other means. There must be fluid flow for the vortex energy harvester to work. Where no flow is present, vibration, acoustics or heat transfer can be utilized. In some cases all three can be utilized together.

The systems and methods described herein address these needs.

DETAILED DESCRIPTION

Figure 1:
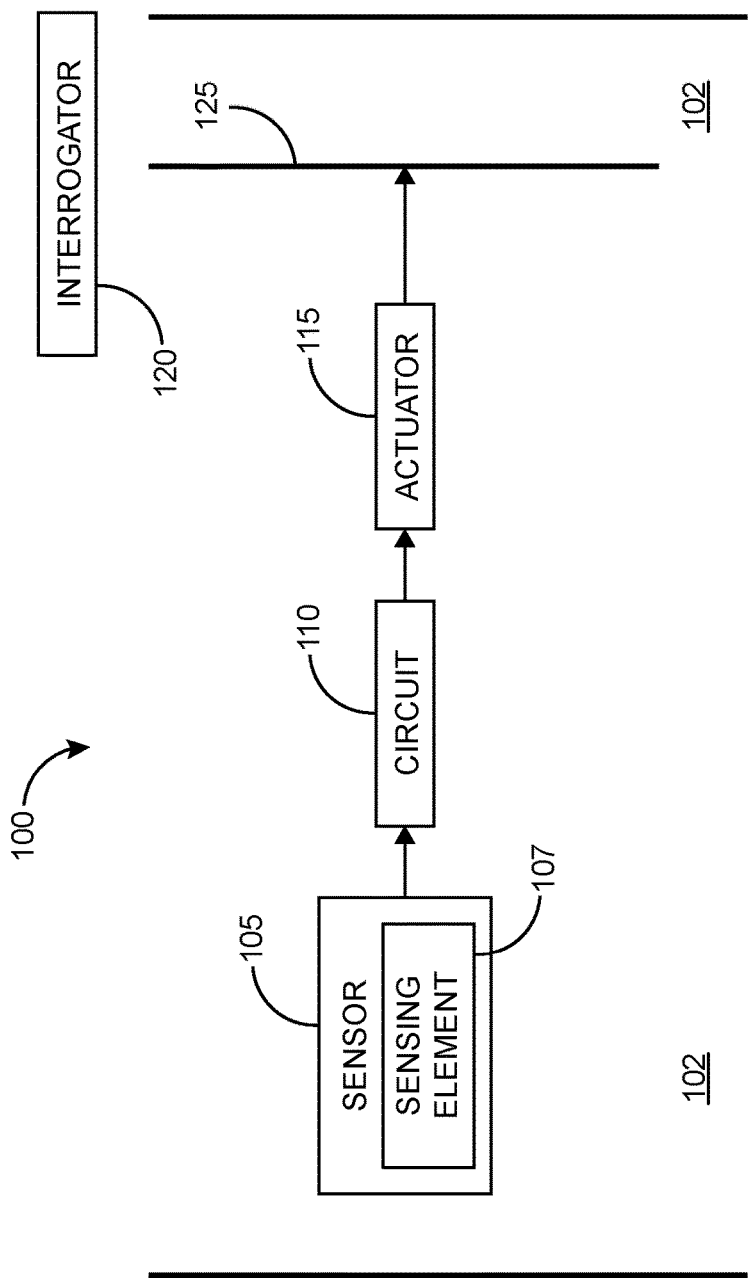
FIG. 1 illustrates the Electro acoustic Technology (EAT) concept for parameter monitoring.

In the following detailed description, reference is made to accompanying drawings that illustrate embodiments of the present disclosure. These embodiments are described in sufficient detail to enable a person of ordinary skill in the art to practice the disclosure without undue experimentation. It should be understood, however, that the embodiments and examples described herein are given by way of illustration only, and not by way of limitation. Various substitutions, modifications, additions, and rearrangements may be made without departing from the spirit of the present disclosure. Therefore, the description that follows is not to be taken in a limited sense, and the scope of the present disclosure will be defined only by the final claims.

The disclosure for downhole use described herein uses the well-known phenomena of vortex induced vibration (VIV) to create mechanical energy that is harnessed using piezo electric crystals to convert the energy to electrical energy via a commercially available energy harvesting chip. While the amount of energy is relatively small, it is sufficient to power sensor electronics and/or charge batteries down hole without electrical connection to the surface. This is useful for Electro Acoustical Technology (EAT) where data is transmitted to the surface using optical fiber cable and Distributed Acoustic Sensing (DAS) techniques. It can also be used for other downhole or subsea applications that require electrical power without electrical connections to the surface. The measurement of the vibration frequency can also be used to determine the velocity of the fluid and hence the flow rate. Thus the device has dual use as an energy harvester and as a flow meter, which is of considerable interest for downhole measurement. Flow measurement is not described in this disclosure.

Because this energy harvesting technology is proposed for use with Electro acoustic Technology (EAT), a very recently developed innovation, it is appropriate to begin with a discussion of that technology.

Description of EAT (Electro Acoustic Technology) Sensors

The EAT sensors and EAT sensing technology described in this disclosure is a recently developed technology and has been described in a recently published PCT application: WO2015020642A1.

EAT Sensors represent a new approach to fiber optic sensing in which any number of downhole sensors, electronic or fiber optic based, can be utilized to make the basic parameter measurements, but all of the resulting information is converted at the measurement location into perturbations or a strain applied to an optical fiber cable that is connected to an interrogator that may be located at the surface of a downhole well. The interrogator may routinely fire optical signal pulses downhole into the optical fiber cable. As the pulses travel down the optical fiber cable back scattered light is generated and is received by the interrogator.

The perturbations or strains introduced to the optical fiber cable at the location of the various EAT sensors can alter the back propagation of light and those effected light propagations can then provide data with respect to the signal that generated the perturbations.

The EAT sensor system can be best understood by reference to FIG. 1, which is an example embodiment of an EAT sensor system. System 100 can include a sensor 105, a circuit 110 coupled to the sensor 105, an actuator 115 coupled to the circuit 110, and an interrogator 120 located at the surface of a downhole system. The sensor 105 is operable to provide a measurement corresponding to a parameter at a location in a region 102. The sensor 105 can be realized in a number of different ways depending on the parameter to be determined by the measurement using the sensor 105. The parameter can include, but is not limited to, a chemical concentration, a pH, a temperature, a vibration, or a pressure. The sensor 105 has the capability of being disposed at a location in proximity of an optical fiber cable 125. The sensor 105 can be located downhole at a drilling site with the interrogator 120 at the surface of the drilling site. The drilling site may be terrestrial or sea-based. Components of the system 100 may be disposed outside casing in cement or strapped to a production tube in a permanent installation. Components of the system 100 also may be disposed in a coiled tube that can be pushed through into a horizontal area of operation, or a wireline cable that can be tractored into a wellbore using an electrically driven tractor that pulls the wireline cable into the wellbore, or pumped into a wellbore with fluid that push/pulls a cable into the wellbore. The system 100 may be used with other drilling related arrangements. The circuit 110, coupled to the sensor 105, can be structured to be operable to generate a signal correlated to the parameter in response to the measurement by the sensor 105. The circuit 110 may be integrated with the sensor 105. For example, a sensing element 107 may be an integral part of the circuit 110 or directly coupled to a component of the circuit 110. The sensing element 107 may be a diaphragm directly coupled to a component of the circuit 110.

The actuator 115 can be coupled to the circuit 110 to receive the signal generated in response to the measurement by the sensor 105. The signal can be a compensated signal, where a compensated signal is a signal having a characteristic that corresponds to the parameter of interest for which variations in one or more other parameters is substantially corrected or removed, or for which the characteristic is isolated to the parameter of interest. The actuator 115 can be integrated with the circuit 110, integrated with the circuit 110 that is integrated with the sensor 105, or a separate structure coupled to the circuit 110.

The actuator 115 can be structured to be operable to generate a perturbation, based on the signal, to an optical fiber cable 125, that may include one or multiple optical fibers. The actuator 115 can be positioned in proximity to the optical fiber cable 125 at the effective location of the sensor 105. The actuator 115 can be structured to be operable to generate the perturbation to the optical fiber cable 125 with the actuator 115 in contact with the optical fiber cable 125, actuating the cable acoustically. The actuator 115 can be structured to be operable to generate the perturbation to the optical fiber cable 125 with the actuator 115 a distance from the optical fiber 125. The actuator 115 may be realized as a non-contact piezoelectric material, which can provide acoustic pressure to the optical fiber cable 125 rather than transferring vibrations by direct contact.

The optical fiber cable 125 can be perturbed with the optical fiber cable 125 in direct contact with the actuator 115 structured as a vibrator or with the actuator 115 structured having a form of voice coil at a distance away from the optical fiber cable 125. The perturbation of the optical fiber cable can be provided as a vibration of the optical fiber 125 or a strain induced into the optical fiber cable 125. Other perturbations may be applied such that the characteristics of the optical fiber cable are altered sufficiently to affect propagation of light in the optical fiber cable 125. With the effects on the light propagation related to a signal that generates the perturbation, analysis of the effected light propagation can provide data with respect to the signal that generates the perturbation.

The interrogator 120 can be structured to interrogate the optical fiber cable 125 to analyze signals propagating in the optical fiber cable 125. The interrogator 120 can have the capability to couple to the optical fiber cable 125 to receive an optical signal including the effects from the perturbation of the optical fiber cable 125 and to extract a value of the parameter of the measurement in response to receiving the optical signal from the perturbation. In an embodiment, the received signal may be a backscattered optical signal. The interrogator 120 may be structured, for example, to inject a short pulse into the optical fiber cable 125. An example of a short pulse can include a pulse of 20 nanoseconds long. As the pulse travels down the optical fiber cable 125, backscattered light is generated. Interrogating a location that is one kilometer down the fiber, backscattered light is received after the amount of time it takes to travel one kilometer and then come back one kilometer, which is a round trip time of about ten nanoseconds per meter. The interrogator 120 can include an interferometric arrangement. The interrogator 120 can be structured to measure frequency based on coherent Rayleigh scattering using interferometry, to measure dynamic changes in attenuation, to measure a dynamic shift of Brillouin frequency, or combinations thereof.

The interrogator 120 can be arranged with the optical fiber cable 125 to use an optical signal provided to the interrogator 120 from perturbing the optical fiber cable 125 at a location along the optical fiber cable 125. An arrangement different from using an optical signal backscattered from the perturbation can be utilized. For example, the optical fiber cable 125 can be structured having an arrangement selected from a fiber Bragg grating disposed in the optical fiber cable in vicinity of the actuator, a non-wavelength selective in-line mirror disposed in the optical fiber cable in vicinity of the actuator, intrinsic Fabry-Perot interferometers as a mode of interrogation from fiber Bragg gratings placed apart in the optical fiber cable such that each fiber Bragg grating is in vicinity of a respective actuator, Fizeau sensors in the optical fiber cable, a second optical fiber to transmit an optical signal from a perturbation of the optical fiber cable to a detection unit of the interrogator, or other arrangements to propagate a signal, representative of a measurement, in an optical fiber cable to an interrogation unit to analyze the signal to extract a value of a parameter that is the subject of the measurement.

Figure 2:
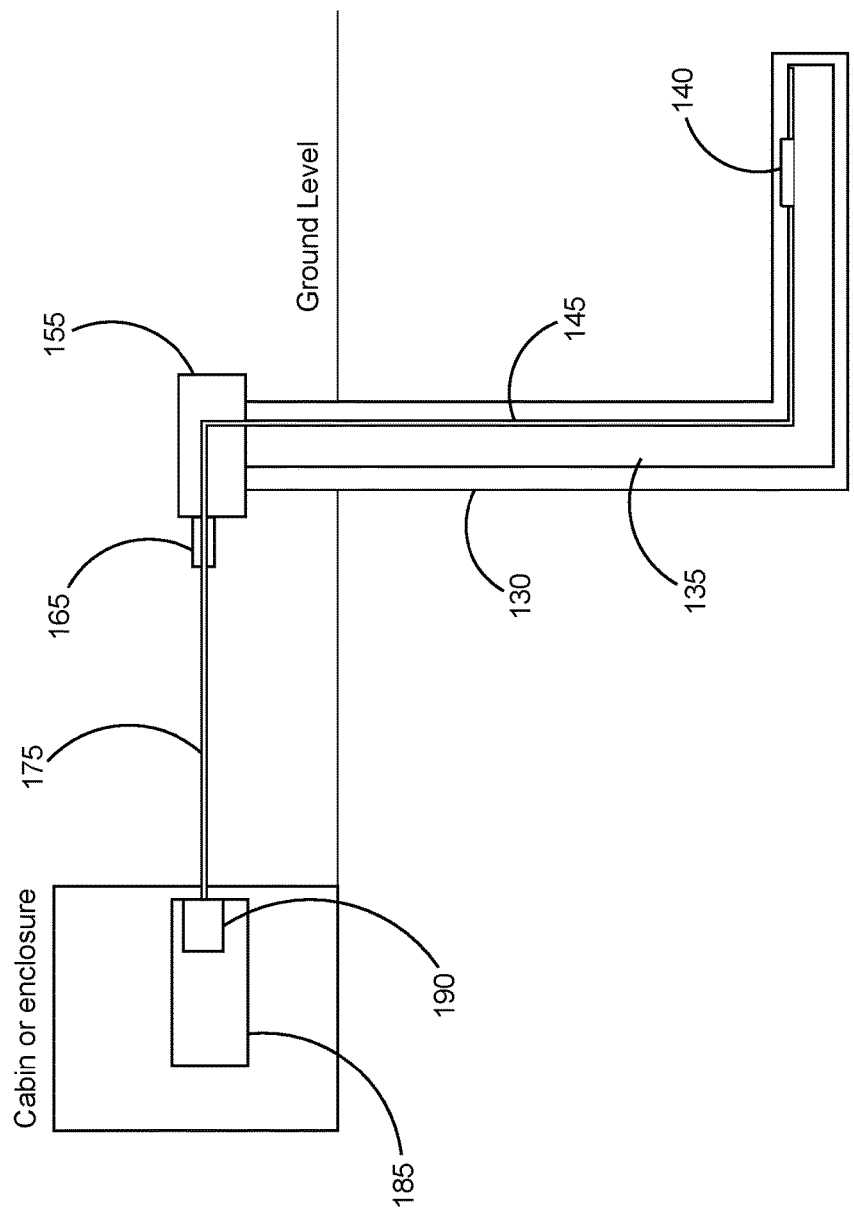
FIG. 2 illustrates a more complete system for utilizing electro acoustic technology in a subsurface well.
Figure 3:
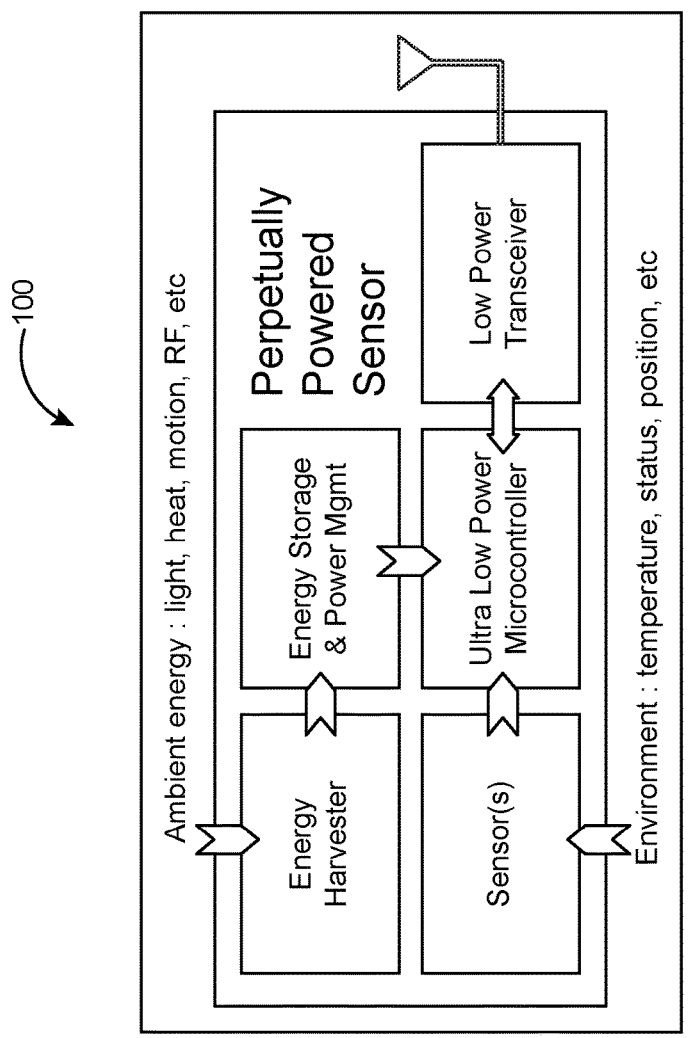
FIG. 3 illustrates some of the main components of an energy harvesting system.

FIG. 2 expands on the use of electro acoustic technology (EAT) sensing systems by illustrating a more complete system. A subsurface well 130 is illustrated, in which a production casing 135 is shown extending through the well. In some applications the production casing may be non-metallic. At the far downhole end of the well an electro acoustic technology sensor assembly 140 is shown. In this example it is shown on the outside of the casing. In some applications the EAT sensor assembly could be within the casing. In many applications there could be multiple EAT sensor assemblies and the technology can easily accommodate that. In close proximity to the EAT sensor assembly shown is a fiber optic cable 145 that is deployed all through the well and back to the surface, then through a wellhead 155. The fiber optic cable 145 may be clamped to the EAT sensor assembly 140 to ensure good transmission of signals. The fiber optic cable 145 exits through a wellhead exit 165 and is connected using a surface fiber cable 175 within an outdoor cabin or enclosure to a Distributed Acoustic System (DAS) interrogator 185. The interrogator may then have a laser source 190 that fires interrogation pulses down through the fiber optic cable and receives backscattered light back from the fiber optic cable.

The fiber optic cable 145 may be permanently installed, or in some applications could be attached to some type of logging cable such as wireline or slickline cables. It could also be clamped on tubing inside the casing 135 in some applications.

The possible advantages from using the above described EAT systems in a variety of configurations may include using a variety of sensors, either electrical or fiber optic based, to measure for example a chemical concentration, a pH, a temperature, or a pressure and using a common optical fiber cable connected to a surface interrogator to measure perturbation signals from each EAT sensor location distributed along that common optical fiber cable and analyzing those signals to extract values of the parameters being measured. The approach can significantly reduce manufacturing complexity, reduce very expensive labor intensive production with expensive equipment like splicers and fiber winders, improve reliability, and widen industry acceptance by allowing the use of sensing technologies of choice. The combination of the EAT technology with energy harvesting using vortex induced vibrations will now be described.

Vortex Induced Vibrations

Vortex induced vibrations are motions induced on bodies interacting with an external fluid flow produced by periodical irregularities on this flow. In many cases, such as subsea structures, like platform legs or risers, the need is to minimize these vibrations to reduce structural fatigue. In this disclosure we do the opposite and take advantage of the vibrations to create electrical energy. For a circular cylinder perpendicular to the flow, the streamlines around the cylinder are symmetrical at low Reynolds numbers. As the flow, and so the Reynolds number, increases, the flow becomes asymmetric and a Karman vortex street forms, a repeating pattern of swirling vortices caused by unsteady separation of flow around the blunt body. This creates periodical lateral forces on the cylinder, causing it to vibrate.

Figure 4:
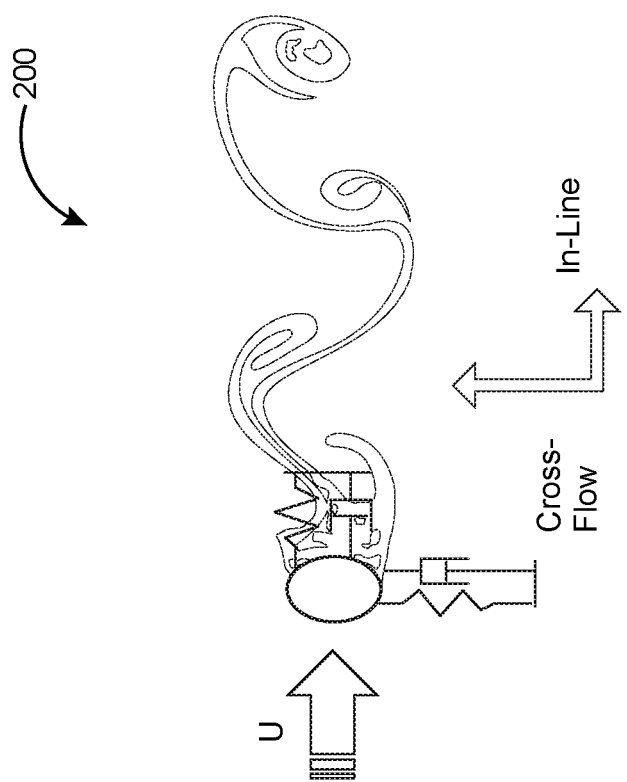
FIG. 4 illustrates a spring dashpot model of a cylinder in a flow with the Karman vortex street.

This phenomenon is illustrated in FIG. 4. A flow U strikes a cylinder and the simulation of FIG. 4 shows the downstream formation of the Karman vortex street, the repeating pattern of swirling vortices that creates periodical lateral forces on the cylinder.

Like many fluid flow phenomenon, vortex shedding has been observed to be directly dependent on the Reynolds number of the flow. Experiment has shown that for Reynolds numbers between 300 and 300,000 the vortex street caused by a cylinder is fully turbulent. The Reynolds number is directly proportional to the free stream velocity of the fluid and the cylinder diameter, and inversely proportional to the kinematic viscosity of the fluid. For example, a velocity of 0.35 m/s with a cylinder diameter of 4 mm, and a kinematic viscosity of 10 centi Poise, gives an R number of 1400, which is well in the range of the vortex street. Since crude oil has a wide range of kinematic viscosity, the diameter of the harvester must be selected to ensure that turbulence occurs over the expected velocity range.

Vortex Energy Harvesters

Figure 5:
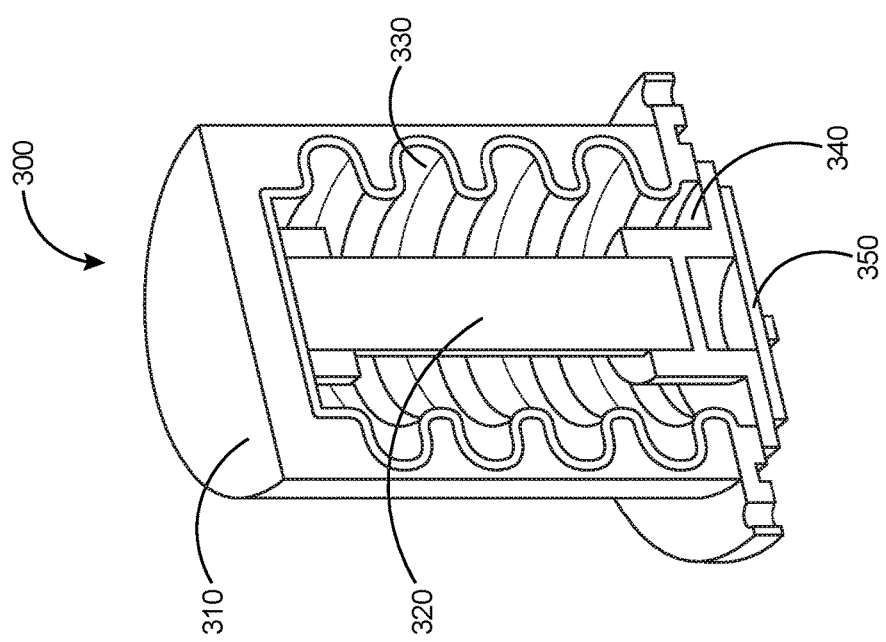
FIG. 5 illustrates one embodiment of a downhole vortex energy harvester.

FIG. 5 illustrates a useful embodiment of a vortex energy harvester. The device has to be small, flexible, and resistant to abrasion, be sealed against external pressure, and be self-contained so that it can be assembled separately and tested before installation on a sensor or drill collar.

The device shown in FIG. 5 consists of a rigidly mounted base 340 to which is mounted a flexible metal bellows 330. This in turn has a molded rubber protection shroud to reduce the effects of abrasion. Between the base and the top of the bellows is mounted a piezo electric crystal 320. All of this is surrounded by a cylindrical body 310 that is deployed in the flow. When the bellows is vibrated by the vortex induced vibration, the crystal is compressed and extended, creating electrical charge between its ends. The charge is conducted by hermetically sealed wires (not shown) to a circuit board 350 that contains a harvesting power supply such as a Linear LTC3588-1 chip. This contains a full wave bridge rectifier with up to 100 mA output at selectable voltages from 1.8V to 3.6V. The chip can either charge a battery or provide direct power to a sensor and transmission system. This can extend battery life to 20+ years. By monitoring the input voltage from the piezo electric crystal the frequency of vibration can be determined for flow calculations. The size and shape of the device are not represented to scale in the drawing in FIG. 4. A typical size might be 10 mm in diameter and 40 mm long, but actual size may differ. An array of multiple energy harvesting devices of varying sizes may be used to optimize energy collection over a range of flow ranges. The design in other embodiments may also have a fin or other addition to create forces and/or vibration of the energy harvesting devices enabling use in laminar flow.

Figure 6:
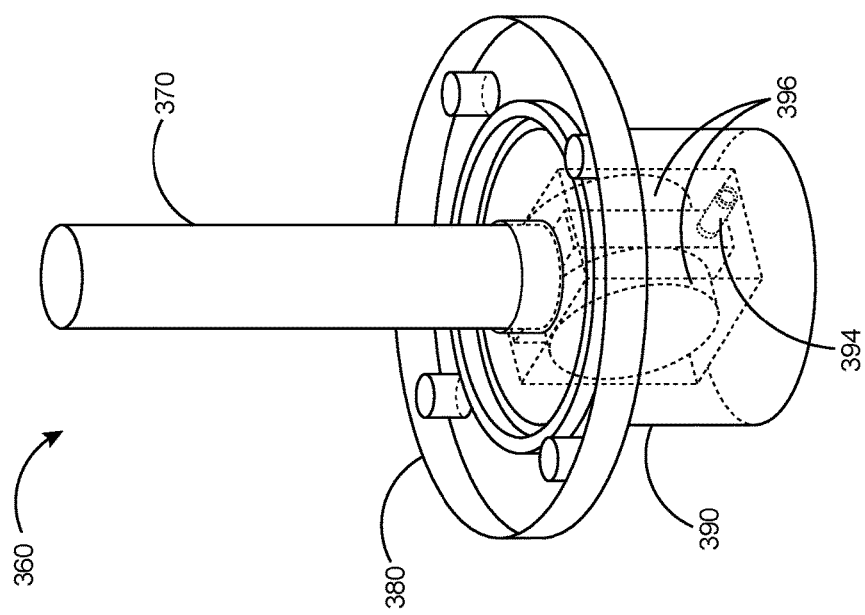
FIG. 6 illustrates an alternate embodiment of a downhole vortex energy harvester.

FIG. 6, shown generally as numeral 360, illustrates an alternate embodiment of a vortex energy harvester. This embodiment has a cylindrically shaped extension 370 passing through a mount plate 380 that can be attached to a downhole casing wall so that the extension 370 is exposed to a fluid flow within the casing. The portion of the extension 370 mounted outside the casing has one or more piezo electric crystals 396 mounted against the extension. The outer faces of the crystals mate with the surrounding housing 390 so there is a close fit. The cylinder extension is mounted on pivot pins 394 which allow the cylinder extension to oscillate perpendicular to the flow. The mount plate 380 protects all of the parts and enables the device to be fastened to a downhole casing. The housing cavity may be filled with an elastomer. Electrical feeds, not shown, enable the piezo electric crystals to be wired to external electronics.

When flow occurs, the vortex shedding causes the cylinder to vibrate perpendicular to the flow, thus compressing and extending the piezo electric crystals sequentially. This then creates a voltage in the piezo electric crystal that can be used to charge a battery or power a sensor.

EAT Application

Figure 7:
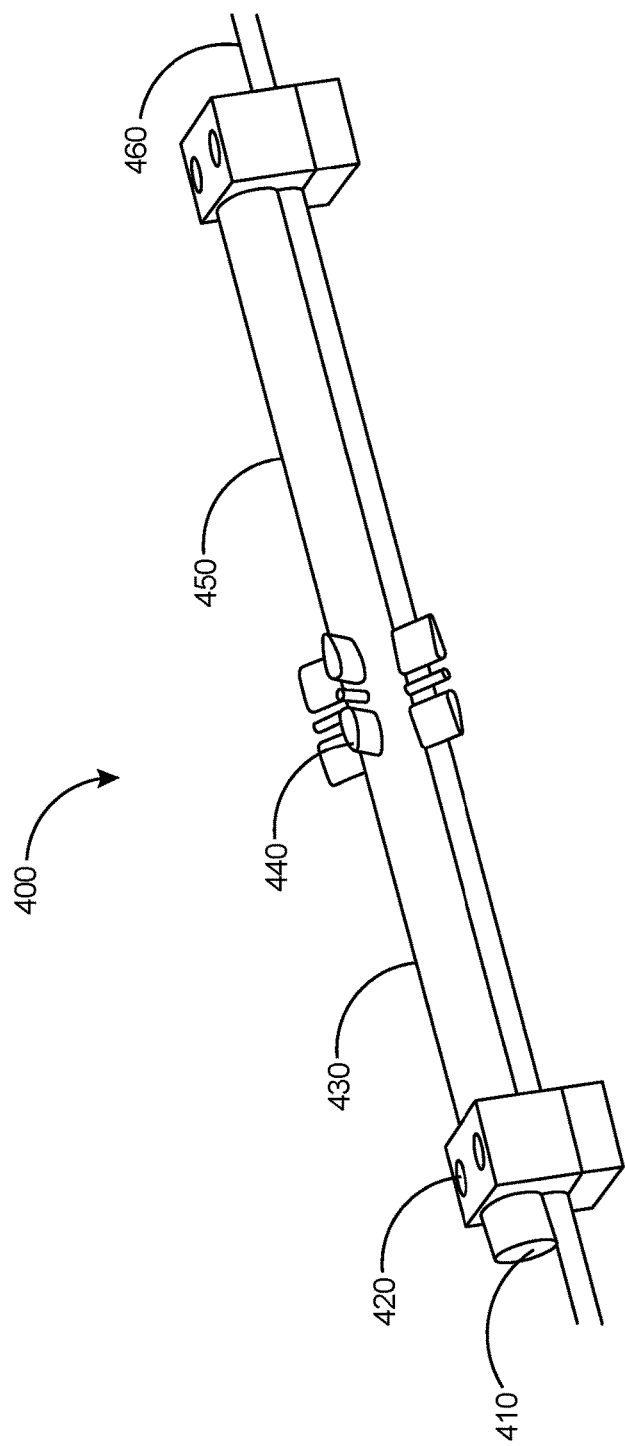
FIG. 7 illustrates an Electro acoustic Technology system with vortex energy harvesters for dip ins.

The EAT sensor concept was described above, but in this case we have added energy harvesting to the design. This is shown in FIG. 7; with the complete EAT sensor assembly shown as numeral 400. The complete EAT sensor assembly is shown with a sensor 410, usually a low cost electronic sensor, on one end. Clamps 420 at the end of the EAT assembly fasten the assembly to a fiber optic cable 460. The EAT concept uses fiber optics for data transmission to the surface based on DAS techniques. It provides point measurement anywhere along the fiber, in addition to gathering distributed acoustic information continuously over the entire length of the fiber. Nano powered sensors can measure temperature, pressure, strain, etc. An ultralow power microprocessor collects the data and transmits it to the surface by pinging the fiber digitally using a piezo transmitter, and the signal may be analog or digital. The necessary electronics 430 for doing this resides inside the EAT assembly. The DAS system decodes the data at the surface. Power may come from an enclosed battery 450 whose life can be extended significantly by charging it from energy harvesters 440 placed around the body of the EAT housing. If only sporadic data is required, the battery can be dispensed with, and capacitive storage used which sends data in bursts. Since the harvesters stick out into the fluid flow, they are protected by turbulators. A turbulator is any device designed to turn a laminar flow into a turbulent flow, thus further adding to the vortex street and hence the vibration of the harvesters. Multiple harvesters can be used if needed.

For short term dip ins, where flow is not occurring, the energy harvester is not required since batteries can provide sufficient power; but for longer monitoring where flow is occurring, the harvesters will provide power.

Production Casing Applications

Figure 8:
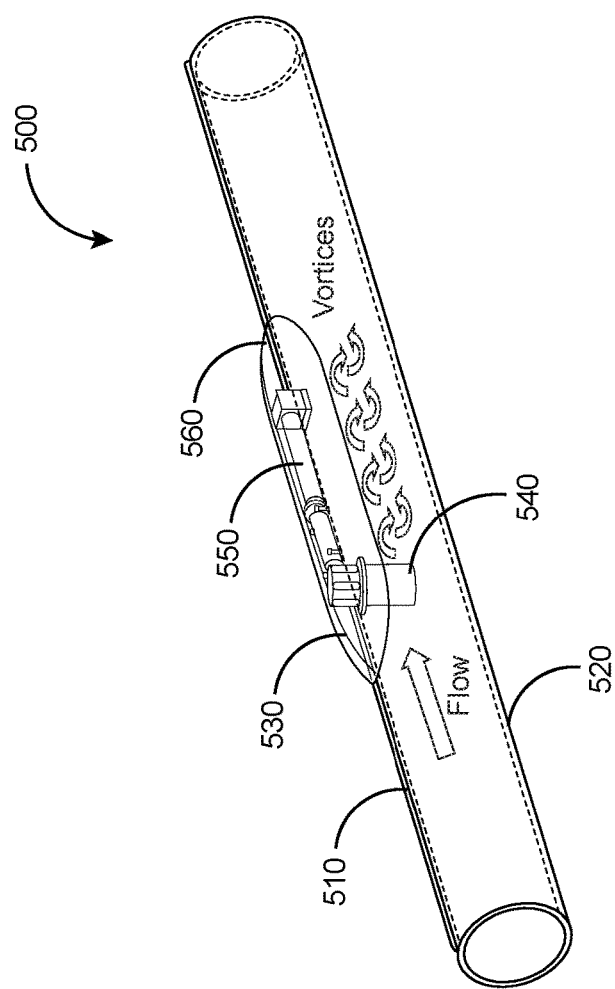
FIG. 8 illustrates a vortex energy harvester in a casing installation.

Turning now to FIG. 8 we see a casing application. In this application the EAT device and DAS fiber cable are mounted on the outside of the casing 520. The EAT assembly 550 is mounted under a retainer 530 in a molded housing 660 using for example a carbon epoxy material. The housing is used to protect the EAT assembly when the collar string is inserted downhole. The vortex energy harvester 540 is mounted inside the collar in the flow of the production fluids. It is mounted from the outside through a hole that is sealed against pressure. Then the EAT assembly 550 is mounted to the collar and connected to the vortex energy harvester. As the fluid flows whole, the cylinder creates vortices, which in turn creates vibration in the cylinder. The vibration is converted to electricity and used to power the EAT or charge a battery which in turn powers the EAT. Multiple harvesters can be installed to increase the power source if required (not shown). An array of harvesters with different diameters can be used to compensate for different velocity ranges. Turbulators can be added in front of and/or behind the harvester to protect it from damage and to increase the turbulence (not shown).

Figure 9:
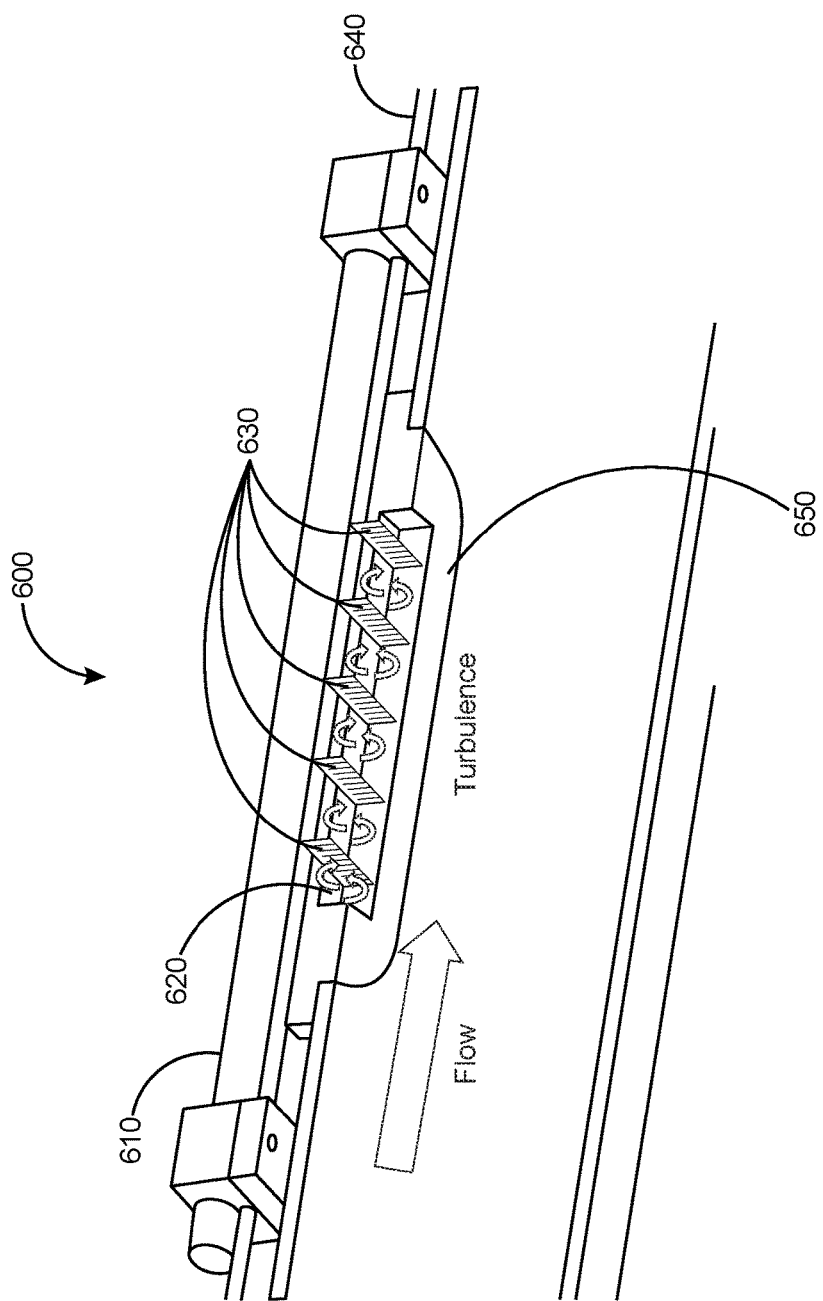
FIG. 9 illustrates an alternate energy harvester concept in a casing installation using a piezo "field of grass".

The energy harvester may sit in a recessed side pocket mandrel where the diameter change may cause vortices. In FIG. 9, a piezo 'field of grass' 630 is shown inside of a sealed offset enclosure 650 instead of the vortex harvester shown in FIG. 8, although the harvester could be used instead. The 'grass' consists of numerous spring metal fingers to which are mounted piezo crystals. As the flow is diverted into the recessed side pocket 620 vortices are created at the entry corner that causes the 'blades' to vibrate. The vibration is converted to electricity by the piezos and used to drive the EAT sensor 610 which is in close proximity or direct contact with fiber optic cable 640. By using numerous blades, sufficient energy is created, and if some blades get broken or bent, there are plenty of others to provide power. There can be single or multiple pockets, each with their own piezo 'field'. This has the advantage over the vortex energy converter of keeping the collar interior free of any physical interference. The EAT may again be protected using retaining covers and molded housings.

Distinctive Features of the Disclosed Technology

The primary methods of providing energy to downhole electronics are via wire from the surface, batteries, or turbines powered by drilling mud. All of these were designed for electronics or devices that consumed significant amounts of energy; therefore there was no need for very small power sources. With the advent of micro-power electronics, and the ability to piggy back on fiber optic DAS systems for data transmission, downhole energy harvesting now becomes feasible as a practical energy source. There are really no direct precedents to this kind of energy source.

Instead of limited life batteries, the batteries can be rechargeable, which greatly extends the useful life of the sensor. Battery less sensors can be run directly with no other energy source than the energy harvester, promising perpetually powered sensors. Turbines wear out and require servicing. The energy harvester has no moving parts, except for its vibrations.

Although certain embodiments and their advantages have been described herein in detail, it should be understood that various changes, substitutions and alterations could be made without departing from the coverage as defined by the appended claims. Moreover, the potential applications of the disclosed techniques is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. A system comprising:
   one or more electro acoustic technology assemblies mounted downhole in close proximity to a fiber optic cable that is part of a fiber optic distributed acoustic sensing (DAS) system connected back to a surface distributed acoustic sensing interrogator; and
   one or more vortex energy harvesters attached to each of the electro acoustic technology assemblies and exposed to a fluid flow in a downhole application.

2. The system of claim 1 further comprising enclosed batteries within the electro acoustic technology assemblies to power an operation of the electro acoustic technology assemblies.

3. The system of claim 1 further comprising enclosed sensors within the one or more electro acoustic technology assemblies to sense parameters of interest.

4. The system of claim 3 further comprising enclosed microprocessor circuitry within the one or more electro acoustic technology assemblies to:
   collect data from the enclosed sensors,
   amplify the data, and
   transmitting the to the surface by actuating the fiber optic cable acoustically.

5. The system of claim 1 wherein the one or more vortex energy harvesters are attached to the one or more electro acoustic technology assemblies and comprise:
   a rigidly mounted base to which is mounted a flexible mounted bellows;
   a piezo electric crystal mounted between the base and the top of the flexible mounted bellows; and
   a circuit board comprising a harvesting power supply.

6. The system of claim 5 wherein the rigidly mounted base, the piezo electric crystal, and the circuit board are enclosed within a cylindrically shaped enclosure.

7. The system of claim 1 wherein the one or more vortex energy harvesters are attached to the one or more electro acoustic technology assemblies and comprise:
   a cylindrically shaped extension passing through a mount plate that to be attached to a downhole casing wall so that the extension is exposed to a fluid flow within the casing;
   one or more piezo electric crystals mounted to the cylindrically shaped extension outside of the casing; the piezo electric crystals and the portion of the extension outside the casing being surrounded by a protective housing; and one or more pivot pins located outside the casing and within the protective housing; the portion of the cylindrically shaped extension outside of the casing mounted onto the one or more pivot pins.

8. The system of claim 1 wherein turbulators to be attached near the one or more vortex energy harvesters.

9. The system of claim 1 wherein the one or more electro acoustic technology assemblies are deployed within and exposed to the fluid flow in the downhole application.

10. The system of claim 1 wherein the one or more electro acoustic technology assemblies and the optical fiber cable of the fiber optic distributed acoustic sensing (DAS) system connected back to the surface distributed acoustic sensing interrogator are mounted on the outside of a production casing and the one or more vortex energy harvesters are mounted inside the casing in the flow of production fluids and connected through a sealed hole in the casing to the one or more electro acoustic technology assemblies.

11. The system of claim 1 wherein the one or more electro acoustic technology assemblies and the optical fiber cable of the fiber optic distributed acoustic sensing (DAS) system connected back to the surface distributed acoustic sensing interrogator are mounted on the outside of a production casing and the one or more vortex energy harvesters are mounted inside the casing in a recessed side pocket mandrel wherein the resulting diameter change creates vortices and each of the one or more vortex energy harvesters comprises one or more spring metal fingers to which are mounted piezo crystals.

12. The system of claim 1 wherein the one or more vortex energy harvesters attached to each of the electro acoustic technology assemblies and exposed to the fluid flow in the downhole application to at least one of charge a battery and provide direct power to a sensor and transmission system.

13. A method comprising:
providing one or more electro acoustic technology assemblies mounted downhole in close proximity to a fiber optic cable that is part of a fiber optic distributed acoustic sensing (DAS) system connected back to a surface distributed acoustic sensing interrogator;
providing one or more vortex energy harvesters attached to each of the electro acoustic technology assemblies and exposed to a fluid flow in a downhole application wherein each of the one or more vortex energy harvesters is vibrated by vortex induced vibration by the fluid flow across the one or more vortex energy harvesters and each vortex energy harvester comprises at least one piezo electric crystal that is compressed and extended, creating electrical charge between ends of the at least one piezo electric crystal; and
wherein the resulting electrical charge is harvested and used to at least one charge a battery and provide direct power to the one or more electro acoustic technology assemblies.

14. The method claim 13 further comprising providing enclosed sensors within the electro acoustic technology assemblies to sense parameters of interest.

15. The method of claim 14 further comprising providing enclosed microprocessor circuitry within the electro acoustic technology assemblies to collect the data from the enclosed sensors, amplifying the data, and transmits the data to the surface by actuating the fiber optic cable acoustically.

16. The method of claim 13 further comprising providing turbulators attached near the one or more vortex energy harvesters to ensure turbulent flow around the one or more vortex energy harvesters.

17. The method of claim 13 wherein the one or more electro acoustic technology assemblies and the optical fiber cable of the fiber optic distributed acoustic sensing (DAS) system connected back to the surface distributed acoustic sensing interrogator are mounted on the outside of a production casing and one or more vortex energy harvesters are mounted inside the casing in the flow of production fluids and connected through a sealed hole in the casing to the one or more electro acoustic technology assemblies and wherein each of the one or more vortex energy harvesters is vibrated by vortex induced vibration by the fluid flow across the one or more vortex energy harvesters and each vortex energy harvester comprises at least one piezo electric crystal that is compressed and extended, creating electrical charge between ends of the at least one piezo electric crystal and the resulting electrical charge is harvested and used to at least one charge a battery and provide direct power to the one or more electro acoustic technology assemblies.

18. The method of claim 13 wherein the one or more electro acoustic technology assemblies and the optical fiber cable of the fiber optic distributed acoustic sensing (DAS) system connected back to the surface distributed acoustic sensing interrogator are mounted on the outside of a production casing and one or more vortex energy harvesters are mounted inside the casing in a recessed side pocket mandrel wherein the resulting diameter change creates turbulent vortices and each of the one or more vortex energy harvesters comprises one or more spring metal fingers to which are mounted piezo crystals that when bent by the turbulence create electric charges and the resulting electrical charge is harvested and used to at least one charge a battery and provide direct power to the one or more electro acoustic technology assemblies.

19. A vortex energy harvester comprising:
a cylindrically shaped extension passing through a mount plate that is to be attached to a downhole casing wall so that the extension is exposed to a fluid flow within the casing;
one or more piezo electric crystals mounted to the cylindrically shaped extension outside of the casing the piezo electric crystals and the portion of the extension outside the casing being surrounded by a protective housing; and
one or more pivot pins located outside the casing and within the protective housing, the portion of the cylindrically shaped extension outside of the casing mounted onto the one or more pivot pins.

* * * * *